Feb. 25, 1930.　　　W. A. WADE　　　1,748,687
MULTIPLE EXPOSURE DEVICE FOR CAMERAS
Filed May 22, 1928
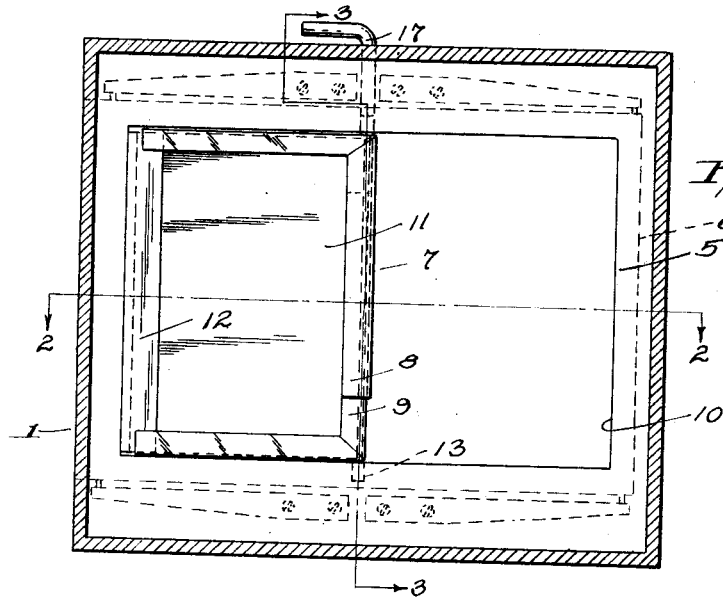
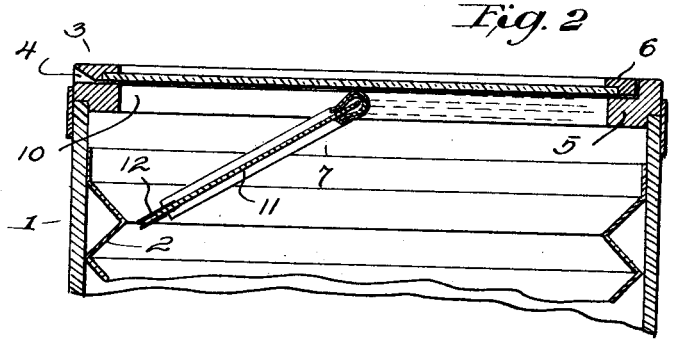
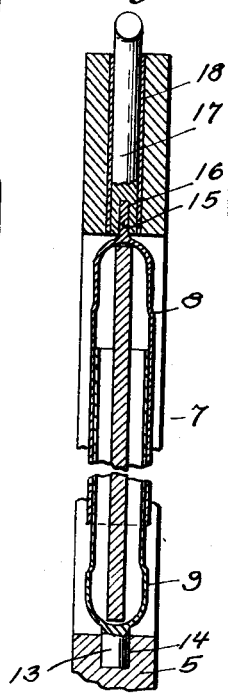
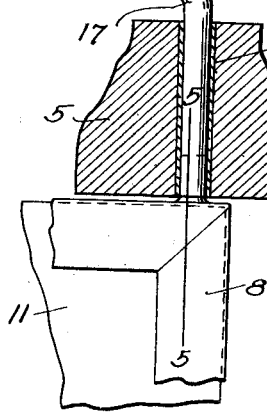
Inventor
William A. Wade
By W. S. M'Dowell.
Attorney Patented Feb. 25, 1930

1,748,687

UNITED STATES PATENT OFFICE

WILLIAM A. WADE, OF COLUMBUS, OHIO

MULTIPLE EXPOSURE DEVICE FOR CAMERAS

Application filed May 22, 1928. Serial No. 279,696.

This invention relates to multiple exposure attachments for plate cameras, and has for its primary object the provision of simple and improved means carried by the removable plate holder of such a camera for permitting a plurality of exposures to be made on a single plate.

Multiple exposure devices of this kind have been employed for some time in connection with plate cameras. In most of the constructions ordinarily employed, however, the controlling shutter is removably mounted upon the inside of the plate holder, with the result that it is necessary to completely detach the plate holder or the back of the camera from the camera casing in order to obtain access to the shutter to effect its position.

It is primarily the object of the invention to provide a camera of this type with means by use of which the shutter may have its effective positions adjusted by the provision of actuating mechanism which may be operated from the exterior of the camera casing, thereby rendering it unnecessary to remove the plate holder or back from its applied position in connection with the rear portion of the camera casing. This feature facilitates the operation of taking multiple exposures, provides for greater convenience in operation and permits of the performance of the operation in less time than is required by previous constructions.

Another object of the invention resides in the provision of the pivotally mounted shutter which functions to control of itself the taking of two or more exposures, the shutter being pivotally mounted in the center of the camera so that it may be swung from one side to the other of the plate to cover or expose the desired plate areas.

For a further understanding of the invention reference is to be had to the following description and the accompanying drawing; wherein, Figure 1 is a vertical transverse sectional view taken through a camera casing, looking toward the back of the casing and showing the improved adjustable shutter in its operative position, Figure 2 is a horizontal sectional view taken on the plane indicated by the line 2—2 of Figure 1, Figure 3 is a vertical sectional view on a slightly enlarged scale taken through the axis of mounting and turning movement of the adjustable shutter, Figure 4 is a detailed view showing a portion of the shutter and its actuating handle, Figure 5 is a sectional view on the line 5—5 of Figure 4.

Referring more particularly to the drawings, the numeral 1 designates the casing of an ordinary plate type of camera, the numeral 2 the folding bellows of the camera and the numeral 3 designates the removable back or plate holder of the camera. This plate holder is of the usual type and is provided with a groove 4, open at one side, to permit of the insertion of the customary sensitized plate (not shown) in the holder.

The holder embodies a substantially rectangular frame 5 and the resiliently movable section 6 which serves to clamp the sensitized plate within the holder. Carried by the frame 5 is a swinging shutter or divider 7. In this instance the shutter comprises a sheet metal frame composed of telescoping sections 8 and 9, which is adjustable to conform to the dimensions of the plate opening 10 provided in the holder 3. The sections 8 and 9 frictionally grip an opaque wall 11 so that said wall will swing in unison with the sections 8 and 9 and yet will be firmly retained in the confines of the shutter. The outer free edge of the wall 11 may be provided with a flexible material as indicated at 12, which closely engages with the inner walls of the frame 5 to obstruct the light and prevent its undue application to the sensitized plate.

In order to mount the shutter for axial turning movement, the lower section 9 is provided with a depending stud 13, which is received within a socket 14 formed in the lower bar of the frame 5. The upper section 8 of the shutter includes a flat stud or web 15 which is receivable within a slot 16 formed in the bottom of an angularly constructed actuating handle 17. This handle has its vertical portion journaled for rotation in a sleeve 18 which is situated in an opening extending vertically through the upper bar of the plate holder 3, and this vertical portion terminates in a horizontally bent arm which may be grasped by the operator so as to effect the rotation for oscillation of the shutter 7.

In view of the foregoing it will be seen that with the present construction the divider plate or shutter may be oscillated to cover first one side and then the other of a sensitized plate carried by the holder 3, and that this actuation can be accompanied from the exterior part of the camera casing, rendering it unnecessary to remove the plate holder from the casing to effect the adjustment of the divider or shutter. Moreover, the shutter is of an adjustable construction which may be readily adapted to plate holders of varying proportions.

What is claimed is:

1. In a plate camera, a casing, a removable back for the casing, said back being formed to include a frame adapted for the reception of a sensitized plate, a swinging shutter provided for the multiple exposure of a plate carried by said back, said shutter being formed to comprise a vertically adjustable pair of telescopic sections, an opaque wall carried by said sections, said wall being of such proportions as to cover substantially the full area of one half of said frame when said shutter is positioned in one or the other of its operating positions, means for pivotally mounting the sections of said shutter in connection with said frame, and an exteriorly projecting operating frame for effecting the rotation of said shutter exteriorly of said casing.

2. In a plate camera, a casing, a removable back for the casing, said back being formed to include a frame adapted for the reception of a sensitized plate, a swinging shutter provided for the multiple exposure of the plate carried by said back, said shutter being formed to comprise a vertically adjustable pair of telescopic sections, said sections being formed from sheet metal and adapted to provide a groove therein, an opaque wall slidably received and frictionally held within said groove, said wall being of such proportions as to cover substantially the full area of one half of said frame when said shutter is positioned in one or the other of its operating positions, means for pivotally mounting the sections of said shutter in connection with said frame, and an exteriorly positioned operating handle for effecting the rotation of said shutter.

In testimony whereof I affix my signature.

WILLIAM A. WADE.